W. VON PITTLER.
ROTARY ENGINE.
APPLICATION FILED MAR. 3, 1910.
988,591.
Patented Apr. 4, 1911.
2 SHEETS—SHEET 1.
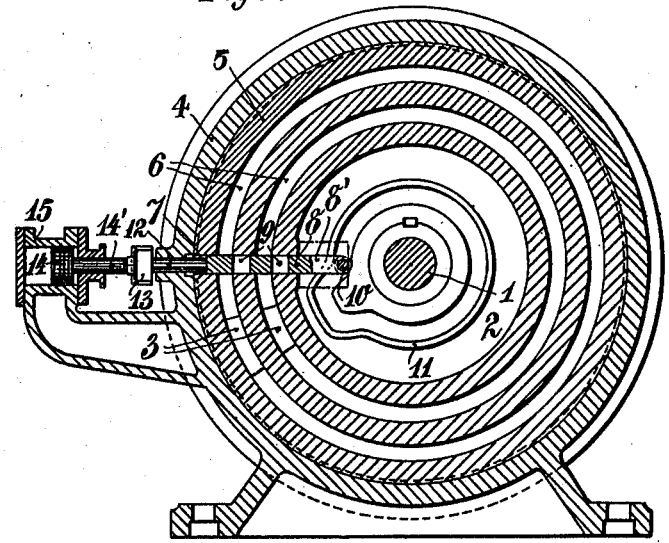
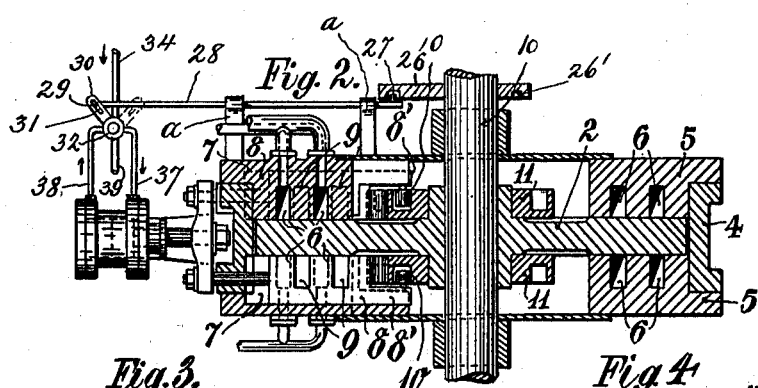
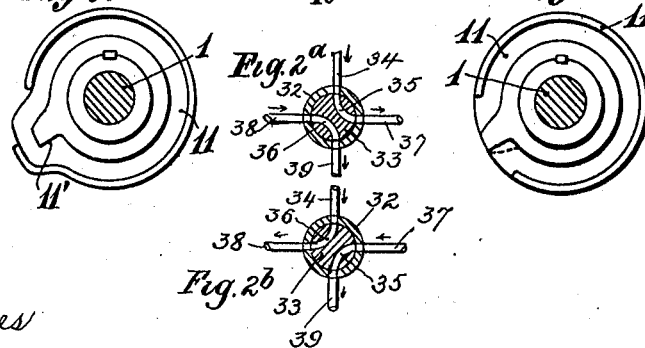
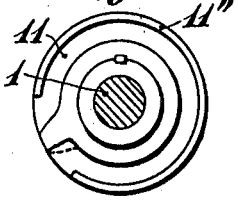
Witnesses
B. Sommers
May Ellis
Inventor
Wilhelm von Pittler
By Henry Orth Jr.
Atty.

W. VON PITTLER.
ROTARY ENGINE.
APPLICATION FILED MAR. 3, 1910.

988,591.

Patented Apr. 4, 1911.
2 SHEETS—SHEET 2.

Witnesses
B. Sommers
May Ellis

Inventor
Wilhelm von Pittler
By Henry Orth Jr.
Atty.

UNITED STATES PATENT OFFICE.

WILHELM VON PITTLER, OF WILMERSDORF, NEAR BERLIN, GERMANY.

ROTARY ENGINE.

988,591. Specification of Letters Patent. Patented Apr. 4, 1911.

Application filed March 3, 1910. Serial No. 547,127.

*To all whom it may concern:*

Be it known that I, WILHELM VON PITTLER, a subject of the King of Prussia, residing at Wilmersdorf, near Berlin, Germany, have invented certain new and useful Improvements in Rotary Engines, of which the following is a specification.

The present invention relates to a rotary engine preferably intended for elastic fluids. The object of the invention is to construct an engine in which all influence of centrifugal forces is obviated and in which means are provided for controlling the abutments so precisely that the clearance spaces are reduced to a minimum. To obtain the first of these objects the engine, which in its general characteristic features corresponds with the engines described in U. S. Patent No. 894,391 differs from this patent in the fact that the grooved part is fixed and consequently the slides arranged in the radial or axial grooves have no peripheral but only a radial or axial movement, the rotating piston being fitted on a rotating drum or disk and engaging into the circular grooves. For controlling the slides rotating cams are fitted on the shaft of the engine, said cams acting on the slides by suitable means. For obtaining the second object the means provided for controlling the abutment slides consist of a combination of fluid pressure controlling means and of mechanically acting means; thus relieving on the one hand the mechanical controlling means by an additional fluid pressure and on the other hand avoiding the lack of reliability of the fluid pressure controlling means by the positive action of the mechanical means.

Figure 5:
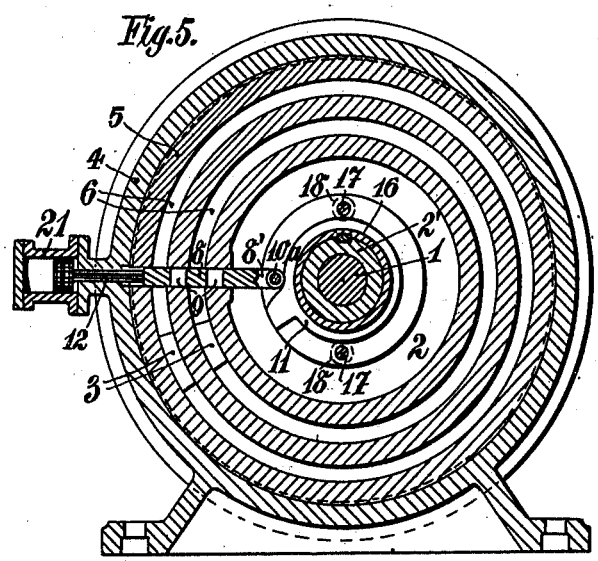
Figure 6:
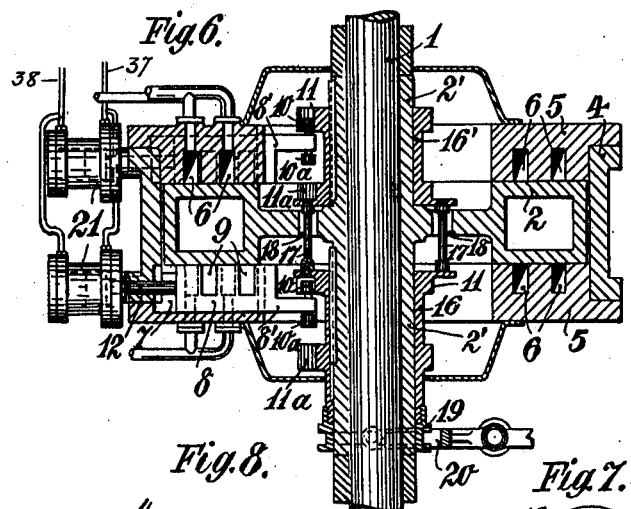
Figure 8:
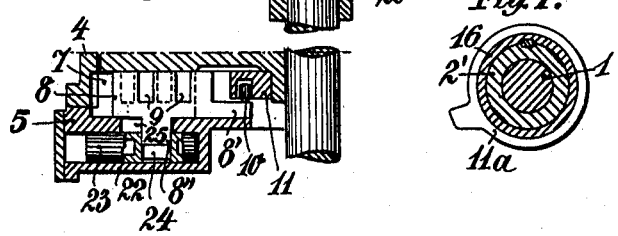
Figure 7:
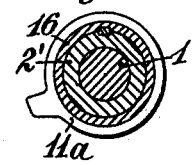

In the drawing various designs of the present invention intended to serve as steam engines are exemplified in the preferable radial type, in these drawings Figures 1 and 2 being one design shown in vertical cross section and in horizontal section. Figs. 3 and 4 show a modified detail in two different designs; Figs. 5 and 6 represent another design of the engine in cross section and in horizontal section; Fig. 7 is a detail of the latter engine. Fig. 8 shows a particular arrangement of the fluid pressure controlling means.

The engine according to Figs. 1 and 2 has fitted on shaft 1 a disk or drum 2 with projections 3 on its sides, which projections engage in concentric grooves 6 provided on the inside of the face walls or heads 5 of the cylinder 4. In each head 5 a further radial groove 7 has been cut crossing the grooves 6, an abutment slide 8 being fitted in said groove 7. The abutment slides 8 are provided with notches 9, which correspond with the grooves 6 and can be brought to temporarily cover the same by the movement of the abutment slide, in order to allow of the pistons 3 passing, the solid parts of the abutment slides covering and overlapping the grooves. The controlling of the abutment slides 8 is obtained by means of cam action in combination with the action of a pressure medium, say steam. Each abutment slide 8 is provided for this purpose with a roller 10 on an inward extension 8', which roller engages in the groove of a cam 11 revolving together with disk 2; furthermore each slide is coupled at its outward end by means of a rod 12 leading toward outside and a transverse member 13 with the rod 14' of a piston 14 reciprocating in a steam cylinder 15. Any well known mechanism may be used to supply pressure medium, or steam to the slide actuating cylinder, and to this end I have shown connected to the two ends of the cylinder 15, pipes 37 and 38 joined to the casing of a cock or valve 32, to which cock or valve is also connected a steam supply pipe 34 and a vent pipe 39. The plug 33 of this cock 32 is provided with a lever 30 having a slot 31 in which engages a pin 29 on a slide rod 28. This rod is mounted in suitable supports *a* and carries a roller 27 engaging in a cam groove 26' in a cam 26 mounted on the shaft 1 of the engine. The plug 33 has two passages 35 and 36, Figs. 2$^a$ and 2$^b$, Fig. 2$^a$ showing the position of plug 33 when the parts of the engine are in their positions as shown in Fig. 2, and Fig. 2$^b$ showing the position of the plug when its lever 30 is in the dotted line position Fig. 2. The structure is such that actuating fluid is admitted simultaneously to one side of the piston and vented from the other, and vice versa. Any other mechanism may be used to accomplish this end. In order to avoid too great clearance spaces it is necessary to return the abutment slides 8 as closely as possible behind the passing pistons into their inner position in which they shut off the grooves 6. When a cam controlling gear is employed very steep curves have to be used, which will necessarily produce noxious shocks. These shocks may, however, be avoided if according to the present invention the cam gear is relieved by the additional use of the action of a pressure medium. It might seem advisable to effect the control of the abutment slides 8 merely by means of a pressure medium without the use of cam gears; such mode of controlling the slides would, however, not afford a sufficient reliability; in case of a refusal the pistons would strike against the abutment slides, whereby the whole engine would be seriously damaged. By a simultaneous use of the cam action, however, the proper movement of the abutment slides is absolutely safeguarded.

If the engine is to rotate in one direction only, the backward branch 11' of the inside curve of the cam 11, considered in the direction of rotation, may be made quite steep (say radial) Fig. 3, so that the abutment slides 8 may be returned into their closing position by the action of the pressure medium independently of the shape of the outer curve, and if necessary quite suddenly and close behind the piston 3. In the same manner according to Fig. 3 also the front branch of the outer curve can be dispensed with, if the reversibility of the engine is forfeited. If the engine is to be reversible the curves in the cams 11 will have indeed to be quite symmetrical, as shown in Fig. 1, provided there are not two sets of cams arranged as in Figs. 5 and 6 for the ahead and backward rotation.

It may under certain conditions be desirable to stop the engine automatically in case the pressure medium control should fail. For such purpose it is only necessary to entirely leave away the outer curve of the cams, as shown in Fig. 4, so that the abutment slides 8 are indeed moved by the inner curve in an outward direction into the position opening the grooves 6, but not back again into their closing position. In consequence thereof the steam pressure cannot act and the engine will stop automatically. The concentric part 11'' Fig. 4, of the outer rim of the cam may be left, so that the roller 10 traveling over the same and therewith the abutment slide 8 are kept in the open position. This concentric part of the cam may however also be dispensed with according to Figs. 5 and 6.

If the advantages of the shape of the inner curves of the cam shown in Fig. 3 are to be utilized for a reversible engine a separate set of cams will have to be provided for each direction of rotation. Such an engine is represented in Figs. 5 and 6. Here two cams 11 and 11$^a$ of reverse shape are provided for each abutment slide 8. The shape of cam 11 is evident from Fig. 5, the shape of cam 11$^a$ from Fig. 7, both cams being seen in the same direction. The two cams 11 and 11$^a$ for each slide 8 are fitted on a common sleeve 16 or 16' respectively adjustably but not rotatably fitted on the extension boss 2' of the piston disk or drum 2. The two sleeves 16, 16' are coupled with each other by means of bolts 17 passing through holes 18 in disk 2. The sleeve 16 is provided at its outer end with a groove 19, in which a bifurcated lever 20 engages. The extension 8' of the abutment slides 8 are fitted with rollers 10, 10$^a$ on both sides; of which, according to the direction of rotation, the one 10 or the other 10$^a$ works together with the respective cam 11 or 11$^a$. The bifurcated lever 20 is suitably coupled in such a manner to the gear for reversing the steam, that on the steam being reversed the cams are exchanged at the same time.

In the engine according to Figs. 5 and 6 the controlling of each of the slides 8 by the pressure medium is independent, a separate controlling piston 21 being provided for each slide. In the design shown in Fig. 8 each slide 8 has likewise its separate pressure medium controlling gear. Here a cylinder 22 has been cast on each head 5. Through a slot 25, which connects the groove 7 with the inside of the cylinder 22, a dog 8'' provided on slide 8 engages in a slot 24 in the piston 23 movable in cylinder 22. Also two or more abutment slides 8 may be provided on either side of the engine in an equidistant arrangement along the periphery of the engine and the number of the pistons 3 may be accordingly increased. Hereby the shaft may be entirely freed from any one-sided pressure on the bearing. The increase of the number of the pistons and slides is, however, to a certain degree limited by the consideration due to the expansion. By symmetrically arranging the working grooves 6 on both sides of the piston disk or drum 2 a total relief can be obtained in an axial direction.

Instead of running the engine with single expansion, as shown, it may be also constructed as a multiple expansion engine, by arranging the single grooves 6 in a suitable manner behind each other or in groups. Furthermore the grooves on the two sides may be of different sectional area, whereby the grooves of the smaller sectional area would be used for the first expansion stage. The increase of the sectional area of the grooves would be possible by increasing the depth of the grooves, their width and the stroke of the slides being maintained; however the grooves on one side might also be made wider, in which instance of course the abutment slide 8 would have to be controlled by separate cylinders for the pressure medium according to Figs. 5 and 6 or Fig. 8, owing to the difference of their stroke.

Having thus described my invention what I claim and desire to secure by Letters Patent of the United States is:

1. In a rotary engine the combination of a rotary member fitted with pistons, a number of concentric annular grooves for the pistons in the cylinder, an abutment slide across the annular grooves said slide having notches so as to allow a free passage for the pistons, and means for controlling said abutment slide.

2. In a rotary engine the combination of a rotary member fitted with pistons, a number of concentric annular grooves for the pistons in the cylinder, abutment slides across the annular grooves, said slides having notches so as to allow a free passage for the pistons, and means for controlling said abutment slides.

3. In a rotary engine the combination of a rotary member fitted with pistons on its face, a number of concentric grooves for the pistons in one head of the cylinder a radial abutment slide across the annular grooves, said slide having notches so as to allow a free passage for the pistons, and means for controlling said abutment slide.

4. In a rotary engine the combination of a rotary member fitted with pistons on each face, a number of concentric grooves for the pistons in each head of the cylinder, a radial abutment slide across each set of annular grooves said slides having notches so as to allow a free passage for the pistons, and means for controlling said abutment slides.

5. In a rotary engine for elastic fluids the combination of a rotary member fitted with pistons, a number of concentric annular grooves for the pistons in the cylinder, an abutment slide across the annular grooves said slide having notches so as to allow a free passage for the pistons, and means for controlling the abutment slide both mechanically and by the action of fluid pressure.

6. In a rotary engine for elastic fluids the combination of a rotary member fitted with pistons, a number of concentric annular grooves for the pistons in the cylinder, an abutment slide across the annular grooves said slide having notches so as to allow a free passage for the piston, a pressure fluid cylinder, a piston in said cylinder and operatively connected with the abutment slide and a cam revolving with the rotary member and being in operative connection with the abutment slide.

7. In a rotary engine for elastic fluids the combination of a rotary member fitted with pistons, a number of concentric annular grooves for the pistons in the cylinder, an abutment slide across the annular grooves, said slide having notches so as to allow a free passage for the pistons, a pressure fluid cylinder, a piston in said cylinder and operatively connected with the abutment slide, and a revolving grooved cam being in operative connection with the abutment slide and having the outer rim of the groove cut away at the part of the cam producing the outward movement.

8. In a rotary engine for elastic fluids the combination of a rotary member fitted with pistons, a number of concentric annular grooves for the pistons in the cylinder, an abutment slide across the annular grooves, said slide having notches so as to allow a free passage for the pistons, a pressure fluid cylinder, a piston in said cylinder and operatively connected with the abutment slide, and a revolving grooved cam being in operative connection with the abutment slide and having the outer rim of the groove cut away at its eccentric portion.

9. In a rotary engine for elastic fluids the combination of a rotary member fitted with pistons, a number of concentric annular grooves for the pistons in the cylinder, an abutment slide across the annular grooves, said slide having notches so as to allow a free passage for the pistons, a pressure fluid cylinder, a piston in said cylinder and operatively connected with the abutment slide, a separate revolving grooved cam of reverse shape for each direction of rotation and means for bringing one or the other cam into operative connection with the abutment slide.

10. In a rotary engine the combination with a rotary member fitted with pistons; of a cylinder having grooves in which the pistons travel, an abutment slide having passages therein for the pistons, and means at opposite ends of the slide to cause its passages to move into and out of register with the grooves.

11. In a rotary engine, the combination with a rotary member having a piston therein; of a cylinder having a groove therein in which the piston travels, an abutment slide having a passage for the piston, mechanical means at one end of said slide and fluid-actuated means at the other end thereof to simultaneously control movement of the slide with respect to said groove.

12. In a rotary engine, the combination with a rotary member having a piston thereon and its shaft; of a cylinder having a groove therein in which the piston travels, an abutment slide having a passage for the piston, a cam on the shaft acting on one end of the slide and fluid pressure means at the other end of the slide to simultaneously control the movement of the slide with respect to said groove.

13. In a rotary engine for elastic fluids, the combination with a rotary member having a piston on each side thereof, a cylinder having grooves in which said pistons travel, a radial abutment slide on each side of the cylinder having a passage for the piston, and fluid pressure means and mechanical means simultaneously acting on each slide, each of which means is capable of independently operating its pertaining slide.

In testimony whereof I affix my signature in presence of two witnesses.

WILHELM VON PITTLER.

Witnesses:
  ALFRED NUTTING,
  RIPLEY WILSON.

Copies of this patent may be obtained for five cents each, by addressing the "Commissioner of Patents, Washington, D. C."